(12) United States Patent
Dagtekin

(10) Patent No.: US 6,297,449 B1
(45) Date of Patent: Oct. 2, 2001

(54) SLEEVE FOR A CABLE BUNDLE AND METHOD OF MAKING SAME

(75) Inventor: Mehmet-Emin Dagtekin, Stuttgart (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/417,121

(22) Filed: Oct. 13, 1999

(30) Foreign Application Priority Data

Oct. 22, 1998 (DE) .............................................. 198 48 651

(51) Int. Cl.$^7$ ....................................................... H02G 3/22
(52) U.S. Cl. .................................. 174/65 G; 174/153 G; 16/2.1
(58) Field of Search .................... 174/65 G, 153 G, 174/152 R, 153 R, 152 G, 142, 167, 135, 151, 166 S; 16/2.1, 2.2, 2.3; 248/56

(56) References Cited

U.S. PATENT DOCUMENTS

| | | | |
|---|---|---|---|
| 3,953,665 | * | 4/1976 | Nicholson ........................ 174/153 G |
| 4,232,421 | * | 11/1980 | Tucker ..................................... 16/2.2 |
| 4,454,381 | * | 6/1984 | Ito et al. ............................... 174/151 |
| 5,339,491 | * | 8/1994 | Sims ........................................ 16/2.2 |
| 5,448,017 | * | 9/1995 | Nakajima et al. ................ 174/152 G |
| 5,981,877 | * | 11/1999 | Sakata et al. ..................... 174/153 G |
| 6,010,134 | * | 1/2000 | Katoh ................................ 174/153 G |
| 6,081,964 | * | 4/2000 | Mori .................................... 174/65 G |
| 6,164,706 | * | 12/2000 | Hayes, Jr. ............................. 285/179 |
| 6,171,539 | * | 1/2001 | Sakata ................................... 264/295 |

FOREIGN PATENT DOCUMENTS

2181348 * 12/1987 (GB) .
5-161229 * 6/1993 (JP) .
6-168640 * 6/1994 (JP) .

OTHER PUBLICATIONS

Patent Abstracts of Japan, 09063385A, Mar. 07, 1997.
Patent Abstracts of Japan, 08140245A, May 31, 1996.
German Patent Office Action, May 12, 1999.

* cited by examiner

Primary Examiner—Dean A. Reichard
Assistant Examiner—Angel R. Estrada
(74) Attorney, Agent, or Firm—Crowell & Moring, LLP

(57) ABSTRACT

A sleeve assembly guides a cable bundle through a body panel opening, with a plug matching the body panel opening and with a bent sleeve section on one side of the plug. In order to provide a sleeve for a cable bundle that permits the cable bundle to enter and exit at an angle, a plug matching the body opening with a bent sleeve section on one side and a straight sleeve section on the other is provided, with a retainer to secure the straight sleeve section to the body being provided on the straight sleeve section. The sleeve assembly is injection molded to form a one piece molded elastic sleeve assembly.

11 Claims, 1 Drawing Sheet

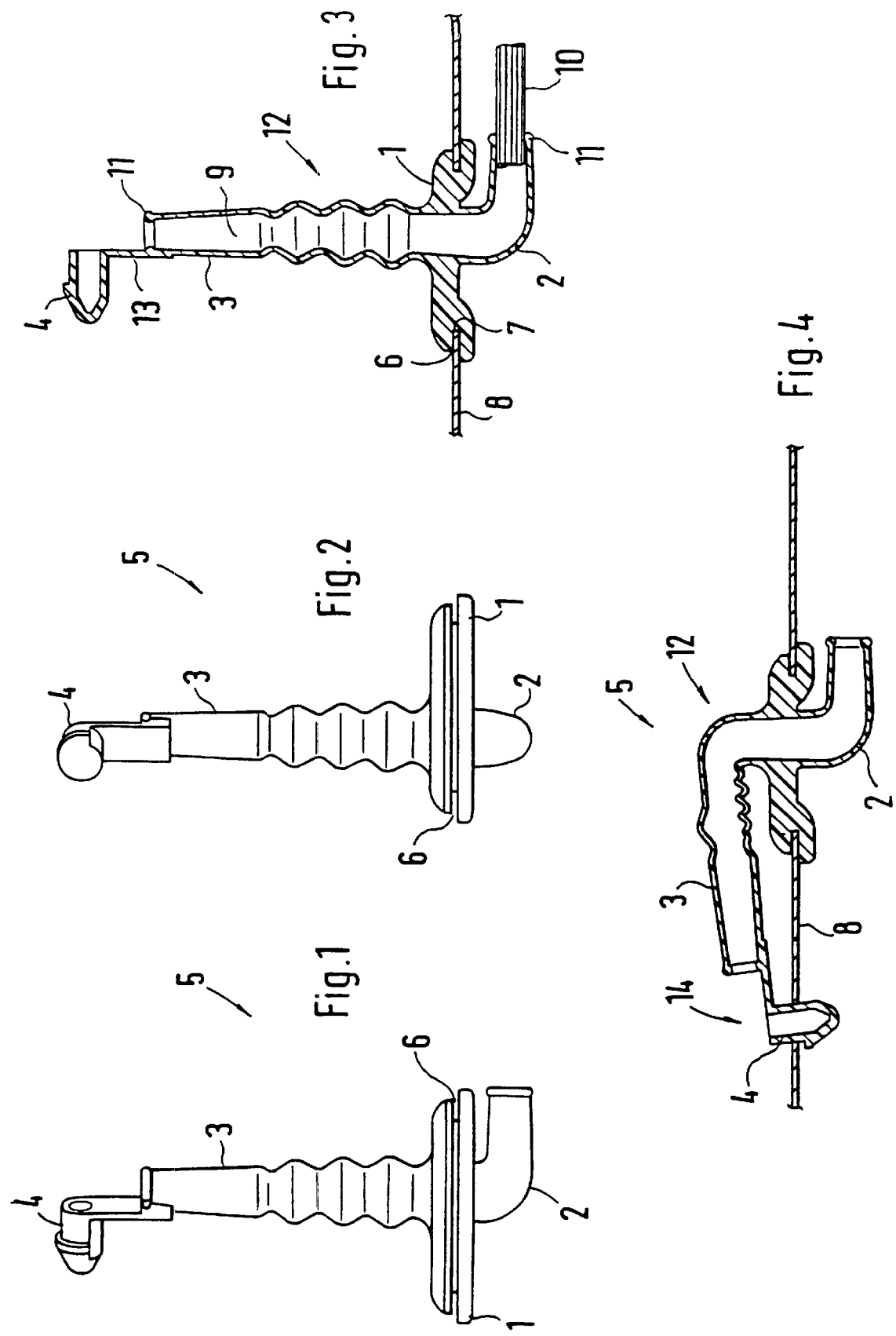

SLEEVE FOR A CABLE BUNDLE AND METHOD OF MAKING SAME

BACKGROUND AND SUMMARY OF THE INVENTION

This application claims the priority of German application 198 48 651.0, filed in Germany on Oct. 22, 1998, the disclosure of which is expressly incorporated by reference herein.

The invention relates to a sleeve for guiding a cable bundle through a body opening. Preferred embodiments of the invention are especially useful in automobile manufacture.

Sleeves of this kind are known with a variety of designs and as a rule guide a cable bundle straight through a body opening, in other words perpendicularly to a body surface. Cable sleeves are likewise known that are bent on one side, so that the cable bundle enters straight on one side of the body opening to emerge on the other side bent at an angle and now parallel to the body surface.

By contrast with this prior art, a goal of the invention is to provide a sleeve for a cable bundle that permits the cable bundle to enter and exit at an angle.

This goal is achieved according to the invention by providing a sleeve for a cable bundle for insertion into a body opening with a plug matching the body opening and a bent sleeve section on one side of the plug, wherein a straight sleeve section is provided on an opposite side of the plug, said straight sleeve section having a retainer to secure the straight sleeve section to a body.

For this purpose, it is proposed, on a matching plug at the body opening, to locate a bent sleeve section on one side and a straight sleeve section on the other, with a retainer being provided on the straight sleeve section to secure the straight sleeve section to the body. In an advantageous manner, it is possible with a sleeve of this kind to guide a cable bundle parallel to the body surface on both the inlet and outlet sides. The fact that only one of the two sleeve sections is bent at an angle allows the sleeve according to the invention to be manufactured simply and economically, since only two cores are required to produce the sleeve by the injection method: a first core extends through the straight sleeve section up to a knee of the bent sleeve section and a second core extends from the outlet of the second sleeve section up to the knee, where it can abut the first core. Despite the straight shape of the second sleeve section, the cable bundle is guided reliably parallel to the body surface, since as a result of the retainer provided on the second sleeve section, this section is bent after assembly and is aligned parallel to the body surface on the exit side.

Advantageous features of preferred embodiments of the invention are described herein and in the claims.

It is proposed to mold the retainer on the straight sleeve section. In this manner, no further production or worksteps are required to manufacture the retainer other than the process for manufacturing the sleeve.

It is also proposed to provide the area where the straight sleeve section abuts the plug with folds. As a result of this design, a specific bent area is produced that both clearly establishes the location of the bend and also ensures that no increased material stresses and hence possible material tears occur in the bent area of the straight sleeve section.

Other objects, advantages and novel features of the present invention will become apparent from the following detailed description of the invention when considered in conjunction with the accompanying drawings.

BRIEF DESCRIPTION OF THE DRAWINGS

FIG. 1 is a first side view of a sleeve constructed according to a preferred embodiment of the invention;

FIG. 2 is a second side view of the sleeve of FIG. 1 rotated through 90 degrees; and FIG. 3 is a sectional view through the sleeve according to the invention in an installed position on a body panel member.

FIG. 4 is a sectional view through the sleeve according to another embodiment of the invention in an installed position on a body panel member.

DETAILED DESCRIPTION OF THE DRAWINGS

The sleeve assembly 5 shown in a side view in FIG. 1 includes a plug 1 with a bent sleeve section 2 located on one side and a straight sleeve section 3 located on the other. This straight sleeve section 3 has a mushroom-shaped retainer 4 on the end. Plug 1, sleeve sections 2 and 3, and retainer 4 together form a composite sleeve assembly 5 molded in one piece.

As shown in FIG. 3, a groove 6 molded circumferentially on plug 1 is designed so that it matches an opening 7 in the body panel 8 and plug 1 is thus secured in opening 7 in a sealing fashion. Sleeve assembly 5 also has a through cavity 9 that passes through the plug 1 and sleeve sections 2 and 3. Cavity 9 serves to receive a cable bundle 10 shown only partially in FIG. 3. Sealing sections 11 are formed at the ends of sleeve sections 2 and 3, said sealing sections being provided for a tight connection between sleeve assembly 5 and cable bundle 10.

The second sleeve section 2 is bent at an angle and has straight wall sections. By comparison, the first sleeve section 3 is made straight and has a corrugated wall profile 12 at its transitional area to plug 1, facilitating the formation of folds in this area.

The mushroom-shaped retainer 4 is spaced slightly from the outlet of cable bundle 10 from the first sleeve section 3, formed by sealing element 11 and set off by a rib 13 in order to be able to grip the retainer 4 separately even when the cable bundle 10 is retracted.

FIG. 4 shows composite sleeve assembly 5 in the fully mounted position. Here the retainer 4 is locked in another opening 14 of the body panel 8 and the first sleeve section 3 is bent in its corrugated area 12. Both sleeve sections 3 and 4 extend approximately parallel to the surface of body panel 8.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Cable support sleeve assembly for insertion into an opening of a body of an automobile comprising:
   a plug through which a bundle of cables can pass perpendicularly to the opening in the body of the automobile,
   a bent cable support sleeve section adapted to be provided on one side of the opening in the body of the automobile,
   a straight cable support sleeve section adapted to be provided on the other side of the opening in the body of the automobile, and a mushroom-shaped holding part on an end of said straight cable support sleeve section, wherein the straight cable support sleeve section has a wave-shaped wall profile in an area of transition adjacent to the plug resulting in a defined bending area that allows positioning of part of the straight cable support sleeve section parallel to the bundle of cables on the other side of the body of the automobile.

2. Cable support sleeve assembly as claimed in claim 1, wherein the holding part is molded on the straight cable support sleeve section.

3. Cable support sleeve assembly as claimed in claim 2, wherein the wave-shaped wall profile is defined by a wall of the straight cable support sleeve section which is corrugated or folded.

4. Cable support sleeve assembly as claimed in claim 1, wherein the wave-shaped wall profile is defined by a wall of the straight cable support sleeve section which is corrugated or folded.

5. Cable support sleeve assembly as claimed in claim 1, wherein said wave-shaped wall profile is provided to facilitate bending of the straight cable support sleeve section to an in use installed position with the holding part engaged in a retainer opening in the body of the automobile.

6. Cable support sleeve assembly as claimed in claim 1, wherein said straight cable support sleeve section is elastically bendable to a position substantially parallel with the body of the automobile.

7. Cable support sleeve assembly as claimed in claim 1, wherein said plug, said bent cable support sleeve section, said straight cable support sleeve section and said holding part are molded together in one piece from elastic materials.

8. Cable support sleeve assembly as claimed in claim 1, wherein, after bending the straight cable support sleeve section, the cable support sleeve assembly can be fastened to the body of the automobile using said holding part.

9. Cable support sleeve assembly as claimed in claim 8, and further comprising a rib by which the holding part is connected with the straight cable support sleeve section.

10. A method of making a cable support sleeve assembly for insertion into an opening of a body of an automobile comprising:

a plug through which a bundle of cables can pass perpendicularly to the opening in the body of the automobile, a bent cable support sleeve section adapted to be provided on one side of the opening in the body of the automobile, a straight cable support sleeve section adapted to be provided on the other side of the opening in the body of the automobile, and a mushroom-shaped holding part on an end of said straight cable support sleeve section, wherein the straight cable support sleeve section has a wave-shaped wall profile in an area of transition adjacent to the plug resulting in a defined bending area that allows positioning of part of the straight cable support sleeve section parallel to the bundle of cables on the other side of the body of the automobile, said method comprising injection molding said cable support sleeve assembly to form a unitary molded cable support sleeve assembly.

11. A method according to claim 10, wherein said injection molding includes molding using a first core extending through the straight sleeve up to a knee of the bent sleeve section, and a second core extending through the bent sleeve section to a position abutting the first core.

* * * * *